Oct. 17, 1933.  H. E. MUCHNIC  1,930,655
BEARING
Filed Feb. 20, 1929   2 Sheets-Sheet 2
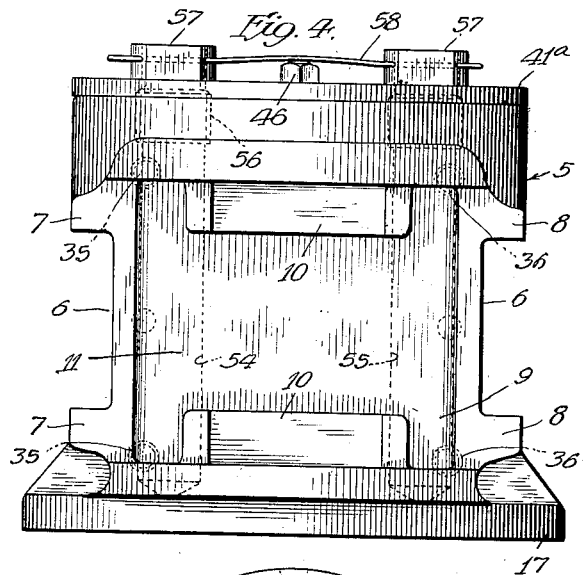
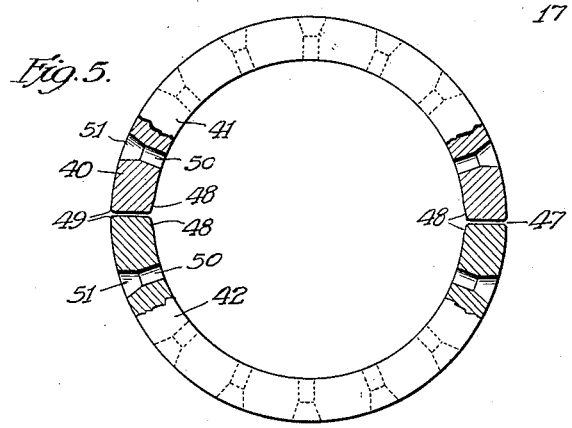
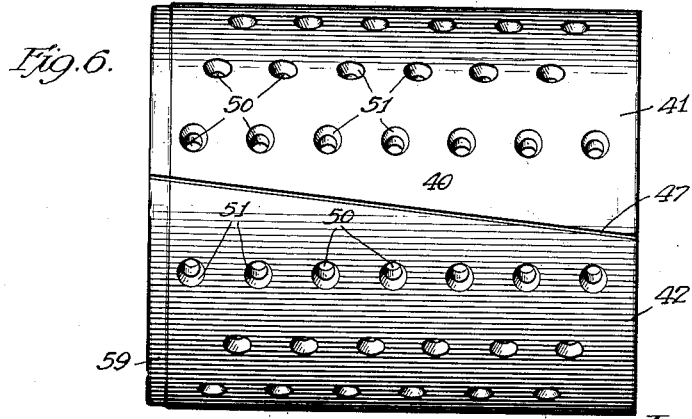

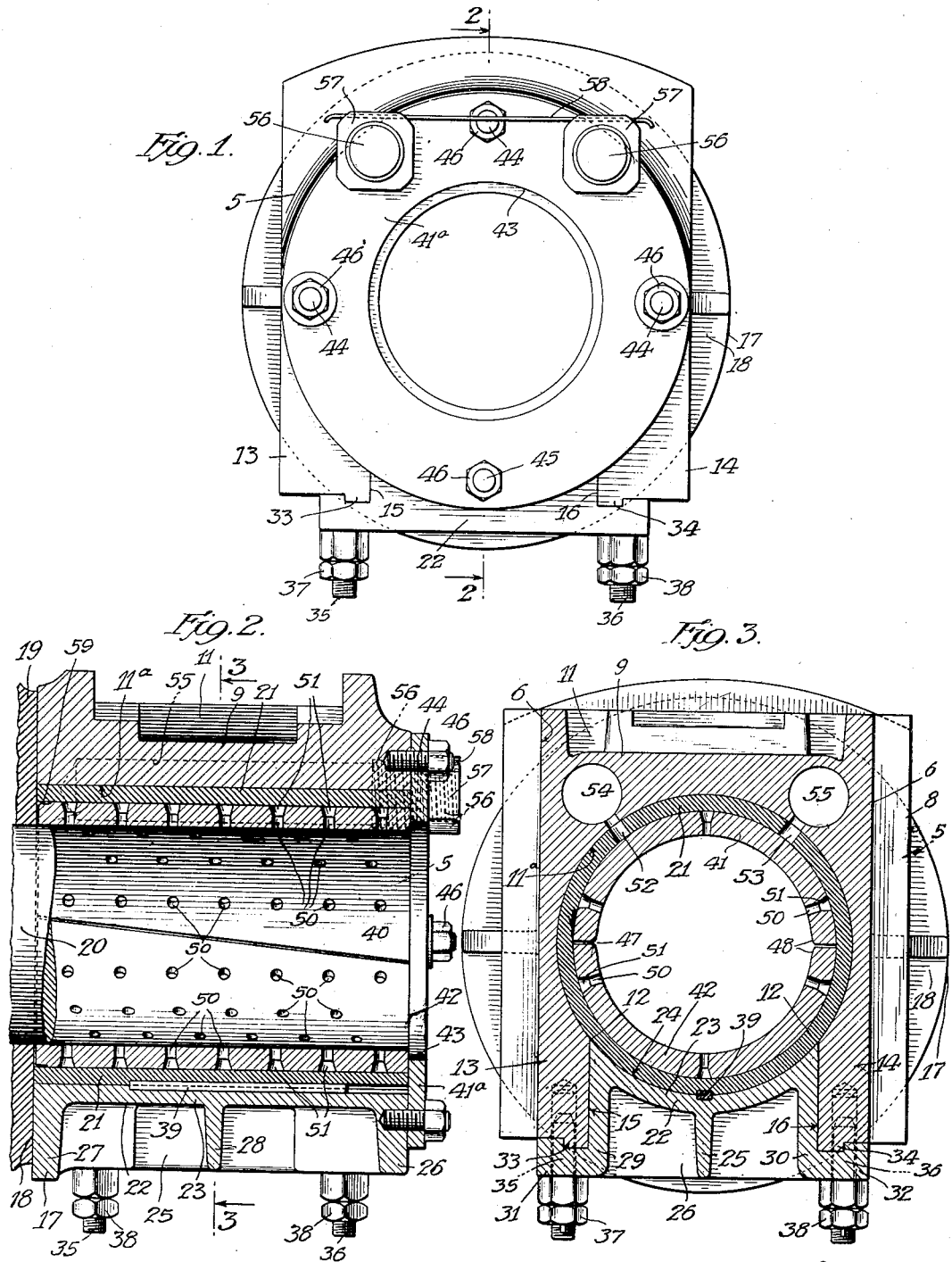

Patented Oct. 17, 1933

1,930,655

UNITED STATES PATENT OFFICE 1,930,655

BEARING

Henry E. Muchnic, Atchison, Kans., assignor to Locomotive Finished Material Company, Atchison, Kans., a corporation of Kansas Application February 20, 1929
Serial No. 341,338

4 Claims. (Cl. 308—43)

This invention relates broadly to bearings and more particularly to that type of bearing particularly suited to locomotives and employed either in the driving journal box or engine truck, the present invention including improvements in bearings having a floating bushing, and while capable of employment as a driving journal box bearing, finds particular utility when employed in the engine truck, the general object being to simplify the construction over other devices of this nature known to me so as to facilitate the economic application of floating bushing bearings to the engine and tender truck journal boxes as well as to the driving journal boxes, and to improve such bearings generally.

It will be understood by those skilled in the art that in a steam locomotive the driving wheel axles are supported for rotation in parallel frames provided with recesses which receive the driving box in which the journal, that is, the brass, is secured, by pressing. Many attempts have been made to reduce and eliminate the distortion of the "brass" due to pounding, it being common practice to provide a bearing brass which overlies the axle and which receives substantially all of the pressure of the locomotive frames on the axles and these bearing brasses have in most instances and in practically all railway practice today been made substantially semi-circular, that is, only the upper part of the bearing actually is a bearing. In this type of driving box, the brass, owing to the longitudinal thrust, tends to become pounded out of shape.

In order to overcome the disadvantages of the present journal box I have provided a device hereinafter described, and its principal objects and advantages reside in the provision shown of an improved type of journal box including the bearing itself and associated elements; the provision of an improved driving box characterized by the embodiment therein of a substantially continuous bearing, that is, a bearing "brass" which completely encircles the axle; the provision of an improved journal box bearing in which the bearing member is floating; that is, revoluble in the box both relatively to and with the axle or shaft; the provision of an improved bearing in which both the "sides", "top" and "bottom" of the bearing function to eliminate the pounding and consequent distortion of the bearing in service; the provision of an improved journal box of the character described in which a revoluble bushing (brass) is employed to eliminate concentrated wear, that is, the concentration of the wear of the bearing in one spot, the provision of an improved bearing having automatic lubricating means; and the provision of a bearing of the character described which is substantially continuous and whereby strains are thereby distributed throughout the bearing member and the life of the bearing therefore increased.

In many of the prior art devices known to me, when repairing a locomotive driving or engine truck box, that is, renewing the brass, it is necessary that the wheels and axle be dropped either into a pit or the whole locomotive hoisted off the wheels in order that the journal box may be removed from the frame for receiving the new brass. In the present invention, I provide an arrangement whereby renewal of the brasses may be simply accomplished by jacking up the box against the tension of the springs, blocking the springs and allowing the box to be relieved of pressure on the axle so as to remove the worn brasses and replace the same with new brasses, this feature being set forth hereinafter in detail.

The engine and tender truck journal boxes may be constructed so as to facilitate renewal of repair of the bearings thereof when on the road, this invention also incorporating a simple and economical means for lubricating the bearing, the practice now having turned in some instances to employing inside bearing on the tender truck as well as on the engine truck, though it will be understood that the invention is equally as well applied to outside bearing trucks, such as those of railway rolling stock generally.

This invention further contemplates the provision of an improved form of the floating bushing, that is, the same is sectionalized and the joints so arranged that the weight is always disposed on some part of the bushing at all times, together with a novel arrangement of lubricant ports which tends to feed the lubricant to every part of and along the surfaces of the bearing and axle.

The foregoing and such other objects and advantages as may appear or be pointed out as this description proceeds are attained in the structural embodiment of the invention illustrated in the accompanying drawings, in which:

Figure 1 is an end elevational view of the device of this invention;

Figure 2 is a longitudinal sectional view taken on the line 2—2 of Figure 1 looking in the direction indicated by the arrows;

Figure 3 is a transverse sectional view taken on the line 3—3 of Figure 2 looking in the direction indicated by the arrows;

Figure 4 is a top plan view of the device of this invention;

Figure 5 is an end elevational view partly in section of the improved bushing of this invention; and Figure 6 is a side elevational view of the bushing.

Referring more particularly to the drawings, the invention includes a housing or box generally designated 5 and including a substantially rectangular portion 6 having spaced flanges 7, 7 and 8, 8 which form channels adapted to receive the pedestals of a truck frame in which the journal box 5 is to be mounted.

The top wall 9 of the journal box is provided with shoulders and a depression 11 for receiving the spring or other resilient portions of the truck mounting. It is to be understood that the box is adapted to move up and down between the pedestals of the truck frame as is common practice.

The rectangular body is formed with an internal bore 11a which terminates at the points 12, 12 to form extending walls or legs 13 and 14 having internal smooth straight surfaces 15 and 16 thus forming an opening in the bottom of the bearing box.

One end of the housing or box 5 is provided with a partially annular flange 17 having an external end face 18 which serves to be presented toward the hub of a driving wheel or engine truck wheel support on the conventional axle which extends through the bearing box, and a fragment of said hub being illustrated at 19, Figure 2, together with a portion 20 of the axle.

Within the bore or bearing or supporting surface 11, I prefer to arrange a liner 21 which is preferably continuous and snugly fits within said bore. The liner 21 will thus extend across the opening formed between the legs 13 and 14 and in order to support the liner at this point, I provide an auxiliary filler or bearing member 22. For the sake of lightness the filler is in the form of a casting having a curved wall 23 provided with bearing surface 24 adapted to snugly engage the liner 21. This auxiliary bearing member is provided at its medial portion with a longitudinal rib 25 serving as a reinforcing means joining the end walls 26 and 27 and a transverse rib 28 joining the side walls 29 and 30 of said filler or auxiliary bearing member.

The external surfaces of the walls 29 and 30, that is, the surfaces presented to the surfaces 15 and 16 are smoothly finished so as to snugly engage the latter mentioned surfaces.

The walls 29 and 30 are cast with laterally extending flanges 31 and 32 which overlie the bottom surfaces of the walls 13 and these walls 13 and the flanges 31 and 32 are stepped to provide shoulders 33 and 34 which prevent distortion of the joints at this point.

Suitable retaining means is extended through the flanges 31 and 32 into the bottoms of walls 13 and 14 such, for example, by the provision of studs 35 and 36 and lock nuts 37 and 38 carried by said studs.

In order to prevent rotation of the liner when in position in the bearing and as well to prevent endwise movement thereof when renewing the floating bushing, a longitudinal key member 39 lies partly in the liner and partly in the wall 23 of the filler 22. The ribs 25 and 28 serve to reinforce the member 22 adjacent to said key member.

Within the liner 21 there is mounted for rotation the main floating bearing bushing 40 which latter, is, in the present instance, preferably formed in two half sections 41 and 42. The bearing bushing will be described in detail later.

It will be observed from an inspection of Figure 2, that the liner and the bearing bushing 40 abut the wheel hub at one end, that is, when the wheel hub contacts with the end of the bearing, and thus the endwise movement of the floating bushing toward the hub to any appreciable degree is prevented. However, to prevent endwise movement of the bearing bushing 40 away from the wheel hub requires a keeper plate best shown in Figures 1 and 2 and indicated at 41a. In order to support the keeper plate, the adjacent face 42 of the bearing box and auxiliary bearing member 22 is smoothed and arranged to form an annular surface against which the annular keeper plate 41a is applied. The keeper plate is of sufficient width as shown in Figures 1 and 2 so that its inner peripheral edge 43 will lie within the external diameter of the floating bushing 40 and thus prevent movement of the bushing in that direction.

The keeper plate is secured in position by the provision of a plurality of stud bolts 44, 44 arranged to extend into the surface 42 of the journal box and by the provision of a stud bolt 45 carried by one end of the auxiliary bearing member 22. It will be obvious that retaining means such as the nuts 46, 46 may be applied to the stud bolts 44 and 45.

Referring now to the floating bushing member itself, it will be observed from Figures 5 and 6 that this floating bushing 40, composed of sections 41 and 42, is formed by employing a cylindrical piece of material suitable for the purpose and cutting this cylindrical piece longitudinally thereof at diametrically opposite points, but preferably on a diagonal line as indicated at 47. In thus cutting the bearing member, some part of the bushing is always in contact on both sides with the axis and, therefore, the chance of pounding at this point is entirely eliminated. Similarly as will be observed in Figure 5, the inner surfaces of the sections 41 and 42 are chamfered or beveled off as indicated at 48, 48 adjacent to the joints in each instance, so as to prevent binding or gripping of the sections on the axle or upon each other at this point. Complementally the external edges at the joints are rounded off as indicated at 49 to prevent external binding.

Furthermore, it is found that, in employing sectionalized bushings such as the bushing of the present invention in a locomotive driving box or railway car journal box, the weight sustained by the bearing is substantially all on the top of the bearing structure and, when the bearing surfaces become slightly worn with a straight cut between the sectionalized bushing sections, as the cut approaches the point of greatest pressure in the bearing, the bushing is caused to stop rotating. However, this difficulty is overcome by the provision of the diagonal cut indicated at 47 so that some part of the bearing is in advance of an adjacent part, and thus there is always a sufficient component of rotative force exerted to keep the bushing rotating.

The sections 41 and 42 of the floating bushing are perforated so as to permit the passage of a lubricant and in the present construction the apertures 50 are preferably arranged in spiral series. In this manner, it will be observed that at some time in the rotation of the bushing each part of the surface of the liner will have an opening pass and the same will be true of the surface in contact with the axle. These apertures 50 are provided at their outer ends with counter-sunk flaring portions 51 so as to induce the lubricant to readily flow into the apertures and tend to compress it therein.

The lubricant apertures 51 are brought successively into communication with apertures 52 and 53 formed in the liner 21 and these apertures 52 and 53 communicate with grease pockets or chambers 54 and 55 formed in the upper portion of the housing 6. The openings 52 and 53 and their communicating passages with the pockets 54 extend across substantially the entire length of the liner and bushing so that an adequate supply of grease reaches the bearing at all times.

The ends of the chambers 54 and 55 are closed by the provision of a standard grease plug shown at 56 in each case. The rotatable elements 57 of the grease plugs in each case are locked against accidental displacement by a lock wire 58 which extends across the top of the housing and passes through suitable apertures provided in the rotatable elements 57.

It will be observed that by the provision of the continuous liner, the possibility of a pound taking place when the joints of the bushing and any joint in the liner come into alignment is eliminated, there being a substantially continuous bearing surface at all times against which the bushing may contact. This construction finds its greatest utility in the engine truck bearing for the reason that the vibration in the engine truck bearing is greater than the vibration occurring in the bearings of the driving box and by the provision of the present structure an increased life of the bearing is afforded by mounting the rotatable bushing within a continuous liner.

For replacement purposes, it will be observed that in most instances, the liner will last for a considerable period and its renewal will not be often required, therefore, it may be made continuous as pointed out. However, when renewing the bushing, it is only necessary to jack up the box so as to take the weight off the rotatable bushing and remove the keeper plate whereupon the bushing may be removed and readily replaced by a new bushing.

In order to prevent binding at the end of the bushing and liner adjacent to the hub 19, the external surface of the bushing for a short distance inwardly from the hub is reduced in diameter as indicated at 59.

It will be observed that as the bushing revolves owing to the spiral arrangement of the lubricated apertures, the grease entering these apertures is caused to move in part from one end of the bearing to the other, and this is further aided by the provision of the diagonally cut joints 47.

Having thus described my invention and illustrated its use, what I claim as new and desire to secure by Letters Patent is:

1. In a bearing, a supporting box member having a cylindrical bearing surface, a continuous liner fixed on said bearing surface, a floating bushing supported for rotation in said box and engaging said liner, said bushing being made in sections, the line of contact between said sections being angularly related to the axis of said bearing, said bushing sections being beveled internally adjacent to said line of contact.

2. In a bearing structure, a supporting box member having a cylindrical bearing surface, a sectionalized floating rotatable bearing bushing adapted to engage said cylindrical bearing surface on its outside face and an axle or shaft on its inside face, said bearing structure being adapted to receive the pressure of a weight supported upon the top thereof which brings said bushing and bearing surface into intimate contact, said sectionalized bushing being split diagonally with respect to the longitudinal axis of the bearing so that the adjacent sections of said bearing member overlap to take the pressure of the weight on the bearing structure to thus keep the bushing rotating at all times in operation.

3. In a journal bearing, a journal box having a cylindrical bearing surface open at the bottom and having spaced legs extending from said surface, the bottoms of said legs being stepped; and an auxiliary bearing member having a curved surface and adapted to fit between the legs of the box, the depending walls of the auxiliary member being flanged laterally to extend beneath the legs of the box, the upper faces of said flanges being stepped to coact with the stepped ends of the box-legs and prevent spreading of the bottom of the box.

4. In a journal bearing, a journal box having a cylindrical bearing surface open at the bottom and having spaced legs extending from said surface, the bottoms of said legs being stepped; an auxiliary bearing member having a curved upper surface and adapted to fit between the legs of the box, the depending walls of the auxiliary member being flanged laterally to extend beneath the legs of the box, said flanges being stepped to coact with the stepped ends of the box-legs and prevent spreading of the box at its bottom; and a floating sectional bushing adapted to entirely encircle the journal.

HENRY E. MUCHNIC.